(12) United States Patent
Erlikhman et al.

(10) Patent No.: US 9,779,224 B2
(45) Date of Patent: Oct. 3, 2017

(54) METHODS AND SYSTEMS FOR CLIENT-ENHANCED CHALLENGE-RESPONSE AUTHENTICATION

(71) Applicant: SecureKey Technologies Inc., Toronto (CA)

(72) Inventors: Ilyea Erlikhman, Maple (CA); Dmitry Barinov, Maple (CA)

(73) Assignee: SecureKey Technologies Inc., Toronto (CA)

( * ) Notice: Subject to any disclaimer, the term of this patent is extended or adjusted under 35 U.S.C. 154(b) by 581 days.

(21) Appl. No.: 14/269,593

(22) Filed: May 5, 2014

(65) Prior Publication Data
US 2015/0318998 A1    Nov. 5, 2015

(51) Int. Cl.
| | | |
|---|---|---|
| G06F 21/00 | (2013.01) | |
| G06F 21/31 | (2013.01) | |
| H04L 9/32 | (2006.01) | |
| H04L 29/06 | (2006.01) | |
| G06F 21/44 | (2013.01) | |
| H04L 9/08 | (2006.01) | |
| H04W 12/06 | (2009.01) | |

(52) U.S. Cl.
CPC .............. *G06F 21/31* (2013.01); *G06F 21/44* (2013.01); *H04L 9/08* (2013.01); *H04L 9/0861* (2013.01); *H04L 9/32* (2013.01); *H04L 9/3271* (2013.01); *H04L 63/061* (2013.01); *H04L 63/0853* (2013.01); *H04L 63/0876* (2013.01); *H04L 63/0884* (2013.01); *H04W 12/06* (2013.01)

(58) Field of Classification Search
CPC ..... G06F 21/31; G06F 21/44; H04L 63/0853; H04L 63/061; H04L 63/0876; H04L 9/08; H04L 9/32; H04L 9/3271; H04L 63/0884; H04L 9/0861; H04W 12/06
See application file for complete search history.

(56) References Cited

U.S. PATENT DOCUMENTS

2011/0010550 A1* 1/2011 Sun ....................... G06F 21/125
                                                             713/171
2011/0099616 A1* 4/2011 Mazur ................. H04L 63/0846
                                                             726/7

FOREIGN PATENT DOCUMENTS

| EP | 1758053 A1 | 2/2007 |
|---|---|---|
| WO | 2010140956 A1 | 12/2010 |
| WO | 2013040684 A1 | 3/2013 |
| WO | 2014008579 A1 | 1/2014 |
| WO | WO2014/008579 A1 * | 1/2014 |

OTHER PUBLICATIONS

M'Raihi et al., IETF RFC 6287, "OCRA: Oath Challenge-Response Algorithm", Jun. 2011.

(Continued)

*Primary Examiner* — Kendall Dolly
(74) *Attorney, Agent, or Firm* — Bereskin & Parr LLP/S.E.N.C.R.L., s.r.l.

(57) ABSTRACT

Methods, systems and apparatus for performing client-server authentication using a device authentication and optional user authentication approach. In a device authentication stage, the client is unlocked to provide access to a cryptographic key used for authentication. In a user authentication stage, the user provides a personal data credential used to generate an additional cryptographic key.

22 Claims, 8 Drawing Sheets

(56) References Cited

OTHER PUBLICATIONS

GlobalPlatform Inc., "Secure Channel Protocol 03—Card Specification v 2.2—Amendment D", version 1.1, Sep. 2009.
Document relating to PCT Application No. PCT/CA2015/050380, dated Jun. 30, 2015 (International Search Report & Written Opinion).
Corella et al., "Techniques for Implementing Derived Credentials", retrieved from <http://pomcor.com/whitepapers/DerivedCredentials.pdf>, dated Sep. 13, 2012.

* cited by examiner

METHODS AND SYSTEMS FOR CLIENT-ENHANCED CHALLENGE-RESPONSE AUTHENTICATION

FIELD

The described embodiments relate to authentication methods and systems and, in particular, to methods and systems for authenticating a device, a user, or both, at a computing device.

BACKGROUND

The convenience offered by the Internet and the ever increasing availability of tablets and mobile devices continues to change the way people and organizations interact with each other all over the world. However with greater online accessibility and usage, organizations and users are at risk of their personal information being compromised. It is becoming increasingly more difficult for organizations to know if the person accessing their service across the digital channel is truly the intended user.

To this end securing online transactions on personal computers (PCs) using various techniques, such as risk-based authentication, browser and device fingerprinting, statistical modeling, and behavioral-based validation, provides some assurance by virtue of the diverse nature of the PC and world-wide web network infrastructure. When applying these similar protection techniques to mobile devices, however, there is much less heuristic data that can be gathered due to the rapid and dynamically changing nature of a network-connected mobile device, further increasing the difficulty of authentication.

Traditional device-based security solutions are not enough in dealing with various modern attacks. For example, a password-plus-PVQ (Personal Verification Questions) scheme adds a second "what you know" factor and provides a higher level of security as compared to pure password-based solutions, however, it is still vulnerable to various types of attacks such as man-in-the-middle, cloning, social engineering and authentication protocol attacks. Phishing, an example of a social engineering attack, can deceive a user into exposing all login credentials including PVQ answers to the hacker. Once exposed, an illegitimate user can easily access the account.

Although device security certificates are commonly used, they are not immune to device cloning attacks. Out-of-band one time password (OTP) token solutions for two-factor authentication on high risk transactions effectively reduce the risk for cloning attacks, but are still vulnerable to man-in-the-browser (MITB) attacks and short-message service (SMS) intercept. In this scenario a hacker can still intercept communication and pass the user credential, including the OTP value, simultaneously back to the real website simply changing the purpose of the transaction. What the user sees and authorizes is different to what is actually happening in the account.

Risk-based security solutions detect abnormal online and mobile behaviors based on heuristic data analysis. The unusual behavior is identified by comparing it with the learned user profile or a device fingerprint. However, due to the technology makeup of mobile devices, device fingerprinting is not very reliable as there is less meaningful data that can be gathered. There are fewer factors that can be used to differentiate user behavior on mobile devices, and heuristic techniques become a guess at best, rendering the solution ineffective.

The strongest level of protection available for personal computing devices (PC or mobile) is security that is rooted in hardware. An example of this is the hardware Secure Element (SE), which is a storage environment, used to securely host applications and their cryptographic credentials. The typical implementation of an SE requires a dedicated secure hardware module, such as a smart card, an embedded Secure Element (eSE), or even a removable SIM within a mobile device.

SUMMARY

In a first broad aspect, there is provided a method of authenticating a computing device using a server, the method comprising: transmitting an unlock request to the server; receiving an unlock challenge from the server; generating an unlock response based on the unlock challenge; transmitting the unlock response to the server for validation by the server; obtaining a key decryption key from the server in response to validation of the unlock response by the server; using the key decryption key, decrypting an encrypted device key stored in a persistent memory of the computing device to obtain a device key in decrypted form; transmitting a device authentication request to the server; receiving a device authentication challenge from the server; and generating a device authentication response based on the device authentication challenge and the device key.

In some cases, the method further comprises: transmitting a user authentication request to the server; receiving a user authentication challenge from the server; prompting for a personal data credential via a user interface of the computing device; receiving the personal data credential at the computing device; processing the personal data credential to generate a credential-derived key; generating a user authentication response based on the user authentication challenge and using the credential-derived key; and transmitting the user authentication response to the server.

In some cases, the user authentication request comprises a device identifier and a user identifier.

In some cases, the user authentication request further comprises a user authentication counter value.

In some cases, the credential-derived key is stored only in a volatile memory of the computing device, and the method further comprises discarding the credential-derived key from a memory of the computing device after generating the user authentication response.

In some cases, the key decryption key is stored only in a volatile memory of the computing device, and the method further comprises discarding the key decryption key from a memory of the computing device after generating the device authentication response.

In some cases, the unlock request is transmitted to a first endpoint of the server. In some cases, the unlock request comprises a device identifier. In some cases, the unlock request comprises an unlock counter value.

In some cases, the unlock response is generated using a first pre-shared key, wherein the first pre-shared key is known to the server and the computing device. In some cases, the unlock response comprises an unlock cryptogram. In some cases, the unlock cryptogram is computed using OATH. In some cases, the unlock response is transmitted to the first endpoint of the server.

In some cases, obtaining the key decryption key comprises receiving an unlocking component, and using the unlocking component to generate the key decryption key at the computing device.

In some cases, the unlocking component is an encrypted version of the key decryption key, and the encrypted version is encrypted using a second pre-shared key.

In some cases, the key decryption key is based on a master key stored in a hardware security module of the server.

In some cases, the device authentication request is transmitted to a second endpoint of the server.

In some cases, the device authentication response comprises a device authentication cryptogram.

In some cases, the device authentication cryptogram is computed using OATH.

In another broad aspect, there is provided a method of authenticating a computing device at a server, the method comprising: receiving an unlock request from the computing device; generating and transmitting an unlock challenge to the computing device; receiving an unlock response based on the unlock challenge; validating the unlock response; when the unlock response is validated correctly, forwarding a key decryption key to the computing device; receiving a device authentication request from the computing device; generating and transmitting a device authentication challenge to the computing device; receiving a device authentication response based on the device authentication challenge; and validating the device authentication response.

In some cases, validating the device authentication response comprises determining that user authentication is required, and the method may further comprise: receiving a user authentication request from the computing device; generating and transmitting a user authentication challenge to the computing device; receiving a user authentication response from the computing device; and validating the user authentication response.

In another broad aspect, there is provided a system for facilitating authentication using a virtual secure element, the system comprising: a computing device; and a server, the server comprising: a server memory; a server processor, the server processor configured to: receive an unlock request from the computing device; generate and transmit an unlock challenge to the computing device; receive an unlock response based on the unlock challenge; validate the unlock response; when the unlock response is validated correctly, forward a key decryption key to the computing device; receive a device authentication request from the computing device; generate and transmit a device authentication challenge to the computing device; receive a device authentication response based on the device authentication challenge; and validate the device authentication response; the computing device comprising: a device memory; and a device processor, the device processor configured to: transmit the unlock request to the server; receive the unlock challenge from the server; generate the unlock response based on the unlock challenge; transmit the unlock response to the server; obtain the key decryption key from the server; using the key decryption key, decrypt an encrypted device key stored in a persistent memory of the computing device to obtain a device key in decrypted form; transmit the device authentication request to the server; receive the device authentication challenge from the server; generate the device authentication response based on the device authentication challenge and the device key; and transmit the device authentication response to the server for validation.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
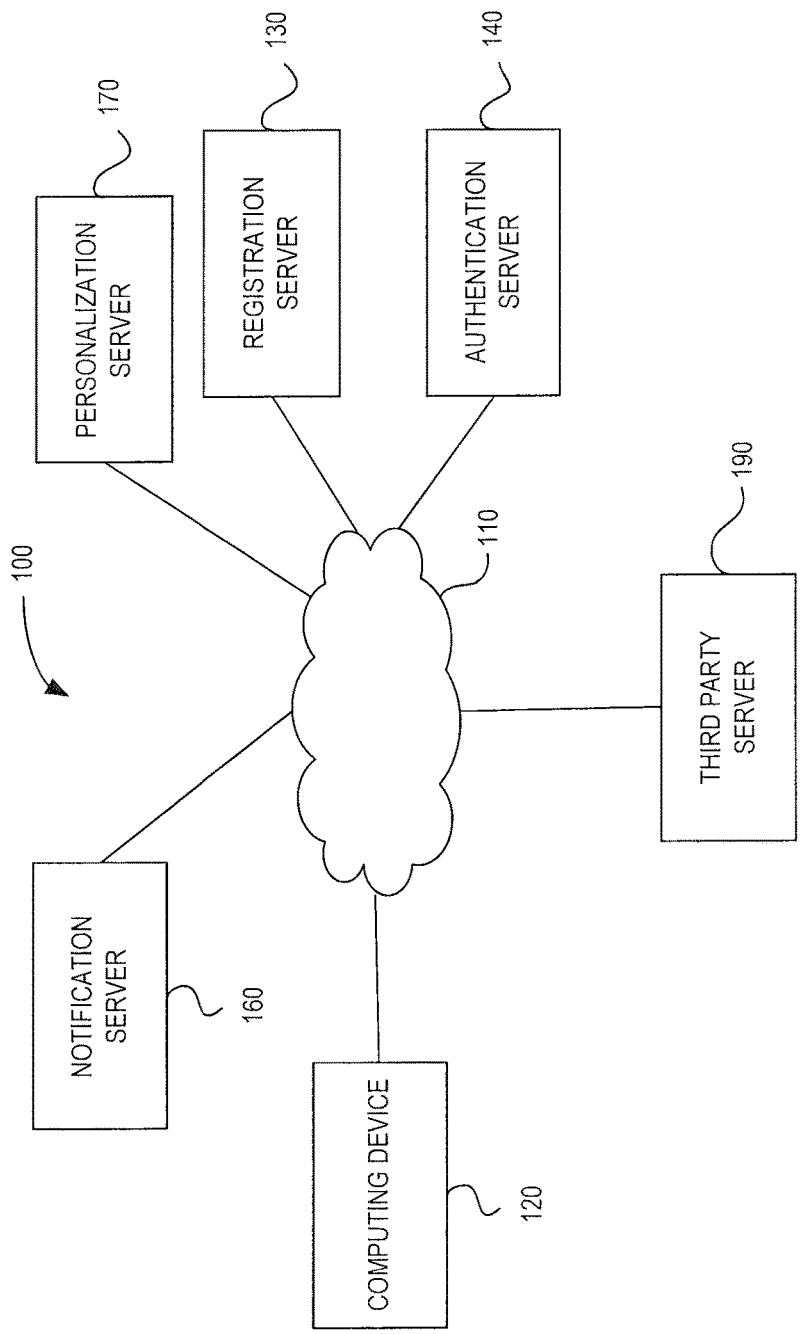
FIG. 1 is a simplified schematic drawing of an example client-server authentication system.

In most conventional mobile devices, dedicated hardware Secure Elements either do not exist or are not accessible for applications to leverage. The described embodiments can implement a virtual Secure Element, which can provide a near-equivalent level of security control as hardware-based SEs. Computing devices that implement the virtual Secure Element are personalized with a unique identifier (device identifier) and cryptographic keys which are used to identify each device and facilitate end-to-end encryption and signing of data, along with encrypted user-defined credential support.

The described embodiments achieve near hardware-level security by providing the smallest possible threat surface. In particular, the described embodiments mitigate complex threats like cloning and key extraction, in addition to standard security vulnerabilities such as phishing, browser/device malware, brute force, replay, etc. Moreover, the described embodiments facilitate implementation of a strong multifactor system based on what-you-have (e.g., mobile device), and what-you-know (e.g., user's passcode) without requiring a hardware secure element.

Man-in-the-middle attacks are mitigated by employing the Global Platform SCP-03 standard for establishing a secure encrypted channel wherever practical. SCP-03 is resistant against MITM attacks. An additional, out-of-band, what-you-have authentication factor can be used to mitigate risk in the event that a user's browser is compromised in a MITB attack.

For communication where SCP-03 is not used, Transport Layer Security (TLS) or Secure Sockets Layer (SSL) may be used, and a white-list employed to provide strong controls against network-based MITM attacks. Certificate checking can also be enforced.

Cloning attacks are mitigated by avoiding storage of sensitive information on the user's device.

Brute force attacks can be mitigated through the use of a counter, coupled with server-based validation.

In general, the described embodiments issue and manage credentials and cryptographic keys, and establish secure communication channels with remote servers and applications.

A user's computing device may be provisioned with cryptographic keys before use. In each device authentication operation, the user's device is first "unlocked" in order to create device credentials.

The described embodiments enhance generally leverage existing client-server authentication techniques. One common approach is set forth by the Initiative for Open Authentication (OATH), which is a body that aims to provide strong authentication of users on a variety of devices and networks.

OATH has developed a challenge-response authentication scheme known as the OATH Challenge-Response Algorithm (OCRA). OCRA is defined in the Internet Engineering Task Force (IETF) Request for Comments (RFC) document, RFC 6287.

OCRA leverages a one-time password approach based on keyed hash message authentication codes (HMAC), also known as HOTP to provide the challenge response mechanism.

In particular, the HOTP mechanism of OCRA uses a shared secret key to calculate a message authentication code (MAC) involving a cryptographic hash function in combination with the shared secret key. This renders OCRA suitable for use with Secure Elements (e.g., smart cards) which offer a trusted environment for storing the shared secret key.

The described methods, systems and apparatuses are usable with both hardware secure elements and other software-based approaches.

A first factor may be stored at the user's computing device in encrypted form, with the decryption key available only upon validation by an external source.

To enhance security, a second factor may be used, which is preferably not stored at the user's computing device and generated anew each time it is needed. Accordingly, the second factor may be unrecoverable if lost. This aspect also provides a protection against brute force attacks, since neither the user's computing device nor a third party can independently verify that the second factor has been correctly entered.

Nevertheless, the described approaches allow an authenticating server to verify that the second factor has been provided at the user's computing device during the course of a transaction authentication.

Moreover, the second factor is settable and resettable by the user at any time using a selection procedure, including after initial provisioning of a user device with a first factor.

For compatibility with existing systems, the described methods and systems allow for selective use of the second factor on a transaction-by-transaction basis. That is, the challenging party (e.g., server) may decide whether to require the second factor at the time of sending the challenge.

The described systems, methods and apparatuses will now be described with reference to the figures. It will be appreciated that for simplicity and clarity of illustration, where considered appropriate, reference numerals may be repeated among the figures to indicate corresponding or analogous elements or acts. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail since these are known to those skilled in the art.

Embodiments of methods, systems and apparatuses described herein may be implemented in hardware or software, or a combination of both. At least some embodiments are implemented at least partially in computer programs executing on programmable computers each comprising at least one module component which comprises at least one processor (e.g. a microprocessor), a data storage system (including volatile and non-volatile memory and/or storage elements), at least one input device, and at least one output device. For example and without limitation, the programmable computers (referred to below as computing devices) may be a computer server, personal computer, personal data assistant, smartphone, tablet computer, and the like. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored in a non-transitory computer-readable storage media or a device (e.g. non-volatile programmable memory, magnetic storage media, optical storage media) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

As used in this detailed description, the terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Further, although method or process acts, algorithms or the like may be described (in the disclosure and/or in the claims) in a sequential order, such processes, methods and algorithms may be configured to work in alternate orders. In other words, any sequence or order of acts that may be described does not necessarily indicate a requirement that the acts be performed in that order. The acts of processes described herein may be performed in any order that is practical. Further, some acts may be performed simultaneously.

When a single device or article is described herein, it will be readily apparent that more than one device or article (whether or not they cooperate) may be used in place of a single device or article. Similarly, where more than one device or article is described herein (whether or not they cooperate), it will be readily apparent that a single device or article may be used in place of the more than one device or article.

As noted above, described herein are methods, systems and apparatus for performing client-server authentication using a layered challenge-response approach. A challenge or "challenge question" is generally data that is used as the basis for generating a response according to a known algorithm. For example, the challenge may be random or pseudorandom data generated by the challenging party, or may include other known data. Generally, in addition to a conventional shared key, the client and server are provided with a second shared key used to compute at least one cryptogram based on the challenge as part of the challenge-response approach. The client does not store the second shared key, and instead stores only an encrypted version of the second shared key, which is encrypted using a key derived from a personal data credential.

Referring now to FIG. 1, there is illustrated a simplified schematic drawing of an example client-server authentication system. System 100 includes a user computing device 120, a registration server 130, a personalization server 170, an authentication server 140 and, optionally, a notification server 160 and one or more third party servers 190, all of which are connected by at least one communications network 110.

Communications network 110 is a data communication network, or one or more connected private or public data communications networks, such as the Internet. As a baseline, communication between computing device 120 and server 130, server 140 and server 190 is generally secured or encrypted, or both, using one or more known methods, such as Transport Layer Security (TLS), Virtual Private Networks (VPN) and the like.

In some embodiments, referred to herein as offline modes, computing device 120 and authentication server 140 may lack connectivity via communications network 110, or connectivity may be intermittent.

Figure 2:
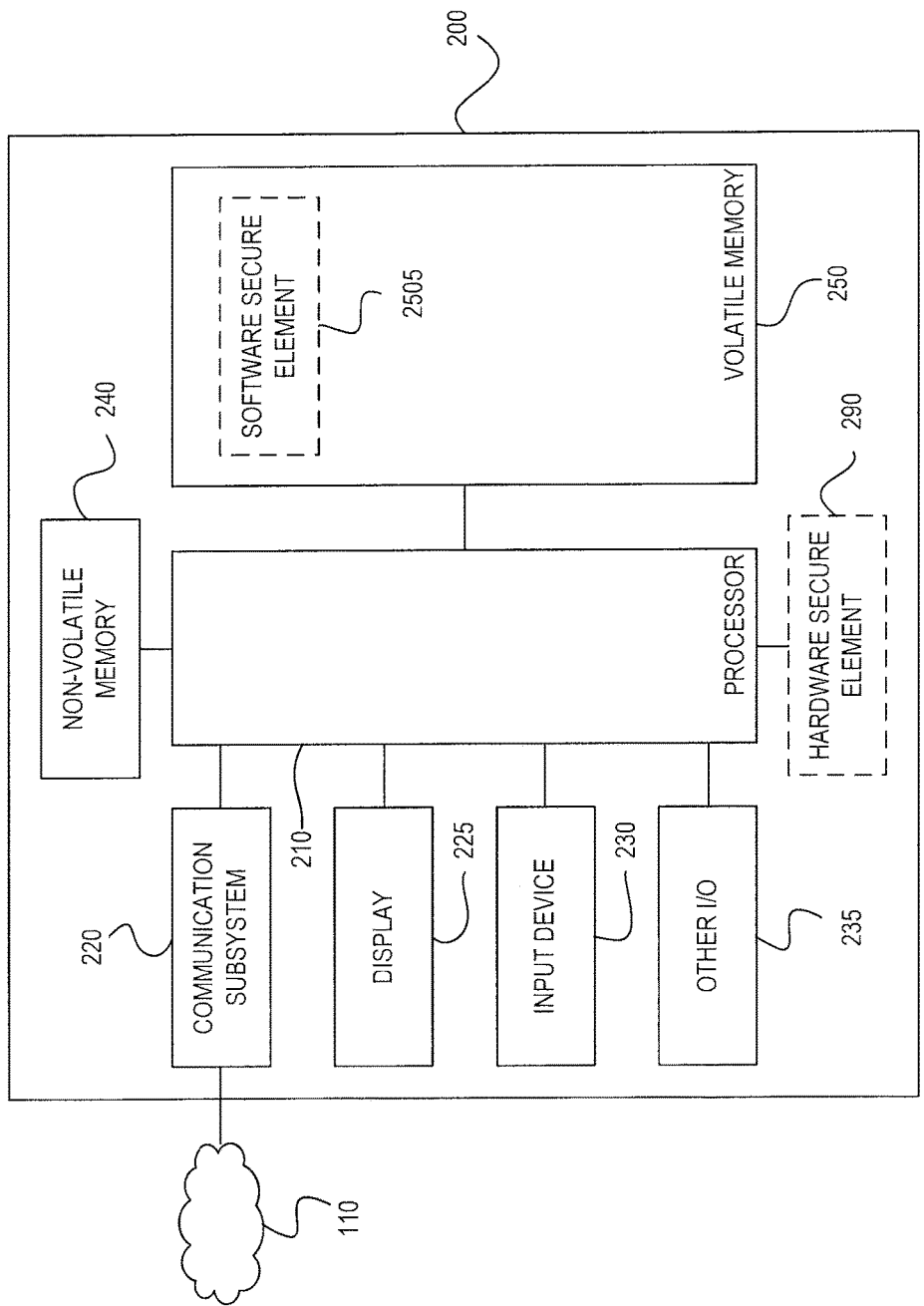
FIG. 2 is a simplified block diagram of an example computing device for use with the system of FIG. 1.

Referring now to FIG. 2, there is illustrated a simplified block diagram of an example computing device. Computing device 200 is one example implementation of computing device 120 of FIG. 1.

Computing device 200 is generally a personal computer, personal data assistant, smartphone, tablet computer, or the like. Computing device 200 includes a processor 210, a communications subsystem 220, a display 225, an input device 230 and, optionally, other input-output devices 235. Computing device 200 also includes a non-volatile memory 240, which stores executable program code (e.g., application programs, operating system) and other data (e.g., user data) used by computing device 200. Computing device 200 also includes volatile memory 250, which temporarily stores program code and data in use by processor 210.

In some embodiments, computing device 200 includes a hardware secure element interface 290. Hardware secure element interface 290 is an interface for communicating with a contact-based or contactless smart card. Contact-based smart cards may be those implemented in accordance with the ISO/IEC 7816 family of standards, for example. Contactless smart cards may be those implemented in accordance with the ISO/IEC 14443 family of standards.

Smart cards, or integrated circuit cards as they are sometimes called, are typically small integrated circuits that include a microprocessor and internal memory. The smart card's integrated circuit provides a trusted environment in which sensitive information can be stored and which provides safeguards against attempted tampering or exposure of the sensitive information. For example, in the context of secure authentication, smart cards may store sensitive secret keys and may be used to perform cryptographic operations upon input data (e.g., generating a cryptogram from input data using the secret key).

In some other embodiments, a hardware secure element interface 290 may not be available or may be disabled. In these cases, a virtual or software secure element 2505 may be provided instead, which is provided by application software executed by processor 210 and which stores sensitive data only temporarily in volatile memory 250.

Communication subsystem 220 includes a wired or wireless communication interface, or both, such as IEEE 802.3 (Ethernet), IEEE 802.11 (Wi-Fi™) Bluetooth™ or the like. In operation, communication subsystem 220 transmits and receives data to and from network 110 under the direction of processor 210.

Display 225 is a display device, such as a liquid crystal display, light emitting diode array, cathode ray tube or the like. In operation, display 225 outputs an image or series of images under the direction of processor 210 for viewing by a user of computing device 200. In some embodiments, display 225 may be omitted.

Input device 230 is an input device, such as a keyboard, keypad, trackpad, trackball, and the like. In operation, a user manipulates input device 230, which generates input signals for reception and further action by processor 210.

In some embodiments, display 225 and input device 230 may be combined, for example as in a touchscreen device.

Other input-output (I/O) devices 235 may include, for example, an imaging device (camera), speaker, biometric reader (e.g., fingerprint reader, retina scanner), or other I/O device. I/O devices 235 may be integrated into computing device 200, or may be connected by way of a peripheral bus interface, such as Universal Serial Bus (USB) or Bluetooth™.

Figure 3:
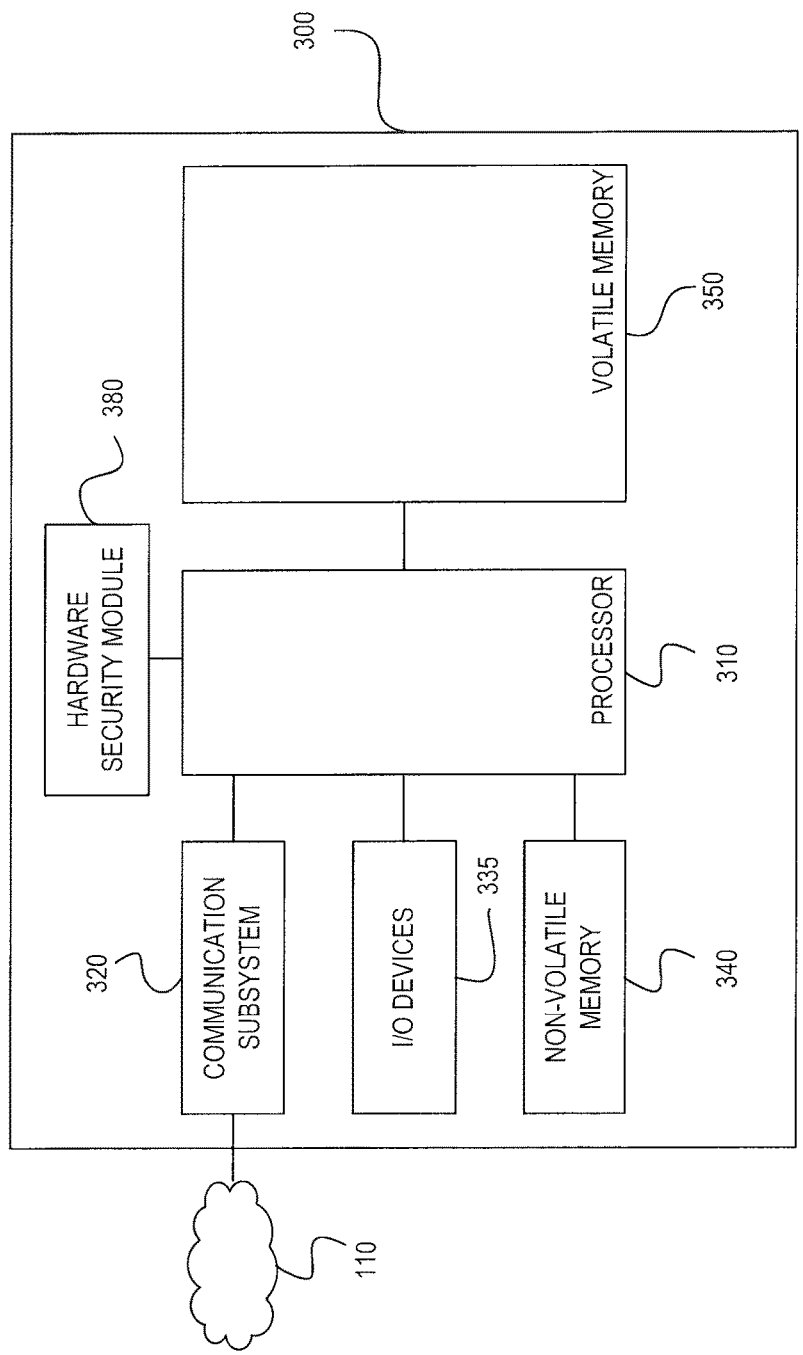
FIG. 3 is a simplified block diagram of an example server computer for use with the system of FIG. 1.

Referring now to FIG. 3, there is illustrated a simplified block diagram of an example server computer. Server 300 is one example implementation of a server computer, such as registration server 130, authentication server 140, notification server 160, personalization server 170 and third party server 190 of FIG. 1.

Server 300 is generally a computer server, which may include one or more similar computer servers, typically mounted in a data center rack. In some embodiments, server 300 may be load balanced, and may include computer servers located in different locations.

Server 300 includes a processor 310, a communications subsystem 320, I/O devices 335. Server 300 also includes a non-volatile memory 340, which stores executable program code (e.g., application programs, operating system) and other data used by server 300. Server 300 also includes volatile memory 350, which temporarily stores program code and data in use by processor 310.

In at least some embodiments, server 300 may include a hardware security module (HSM) 380. HSM 380 is a physical computing device that can be used to safeguard and manage sensitive information used in cryptographic and authentication operations. For example, HSM 380 may store digital keys. Additionally, HSM 380 may include hardware-based accelerated processing elements for accelerating cryptographic processing operations. HSM 380 may be a plug-in card integrated into server 300, or may be attached externally via a peripheral bus.

Communication subsystem 320 includes a wired or wireless communication interface, or both, such as IEEE 802.3 (Ethernet), IEEE 802.11 (Wi-Fi™), or the like. In operation, communication subsystem 320 transmits and receives data to and from network 110 under the direction of processor 310.

Other I/O devices 335 optionally may be provided, for example in the form of a local or remote administration interface.

Figure 4:
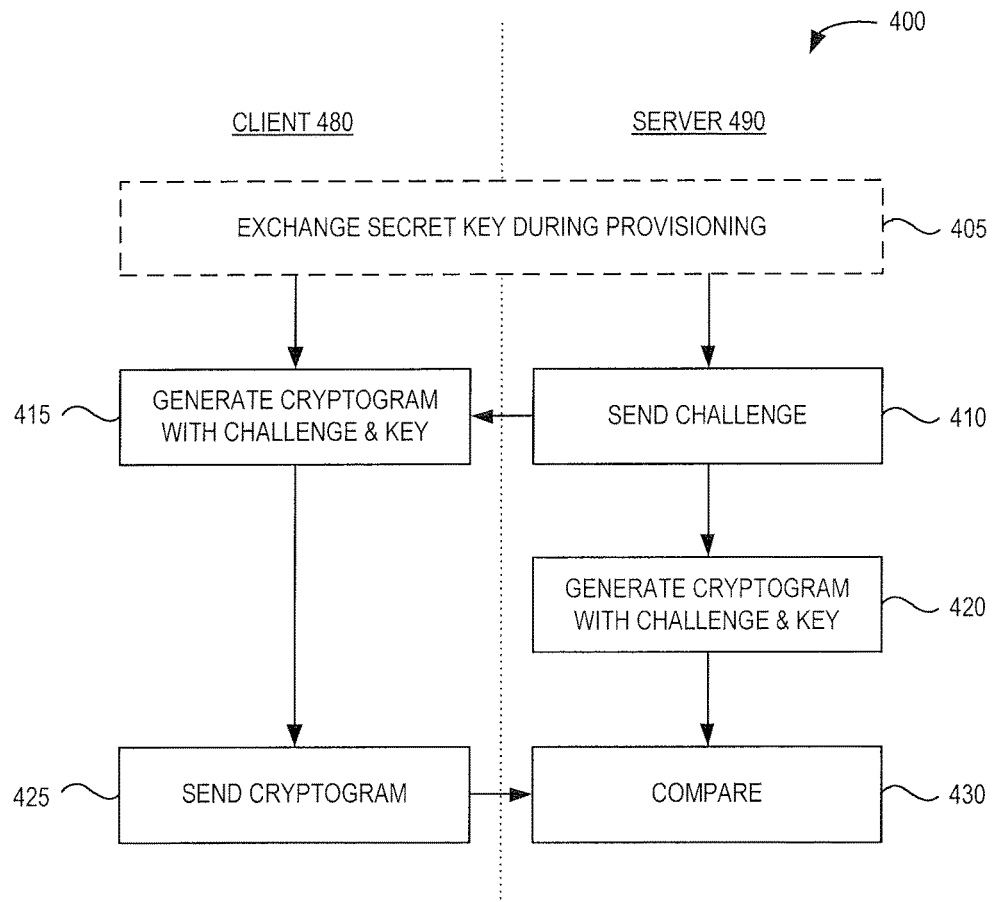
FIG. 4 is a flow diagram for a conventional challenge-response authentication process.

Referring now to FIG. 4, there is illustrated an example flow diagram for a conventional challenge-response authentication process. Flow 400 may be, for example, a challenge-response process in accordance with the OCRA protocol.

Flow 400 may be executed between a client 480, which may be implemented by computing device 120 of FIG. 1, and a server 490, which may be implemented by authentication server 140 of FIG. 1.

Flow 400 generally begins at 410, however it is assumed that the client and server have already been provisioned at 405 (for example, by way of registration server 130 of FIG. 1), such that a shared secret key is available to both the client and server.

At 410, server 490 generates and sends a challenge message to client 480. The challenge message may include one or more "challenge questions" (i.e., data values) generated by the server 490, and may include at least one challenge question supplied by the client 480 (not shown in process 400).

The challenge questions may be concatenated together, or otherwise combined in known fashion, to obtain the challenge message. In some cases, the challenge message may have a predetermined fixed length (e.g., 128 bytes), in which case it may be zero padded or truncated as needed to obtain the desired length.

The challenge questions may include a random or pseudorandom number generated by the client or server, or both. In some cases, the challenge questions may also include a timestamp or counter value, or both, although in other cases the timestamp or counter value may be concatenated or combined with the challenge message in a separate operation. The challenge message preferably is unique to each transaction.

At 415, the client 480 receives the challenge message from the server, concatenates or combines the challenge message with other data (e.g., timestamp, counter value, etc.), and uses the shared secret key to compute a cryptogram, for example a keyed HMAC.

At 420, the server 490 independently computes the same cryptogram, using the shared secret key, and the same challenge message and other data.

At 425, the client 480 transmits the computed cryptogram to server 490, which compares the client-computed cryptogram with the server-computed cryptogram to verify that the client has possession of the correct shared secret key. If the client-computed cryptogram matches the server-computed cryptogram, the server 490 determines that the client has successfully authenticated, and may take further subsequent action as appropriate (e.g., transmit an indication of successful authentication).

The challenge-response authentication described with respect to flow 400 is generally acceptable, but its reliability and security depends on continued secrecy of one factor: the shared secret key. If the shared secret key is compromised, a malicious device can impersonate client 480 and could be successfully authenticated, if no other measures are used. For this reason, hardware secure elements (e.g., smart cards) are sometimes used to safeguard the shared secret key, since hardware secure elements are resistant to software-based attacks and physical tampering. However, the use of hardware secure elements is not always possible or practical.

Preferably, a software-based approach can be used. Such approaches are described herein, in which a software-based approach can be used while still providing good security for secret keys and, optionally, using a second factor to provide additional safeguards in the event that the first factor (e.g., shared secret key) is compromised.

Figure 5A:
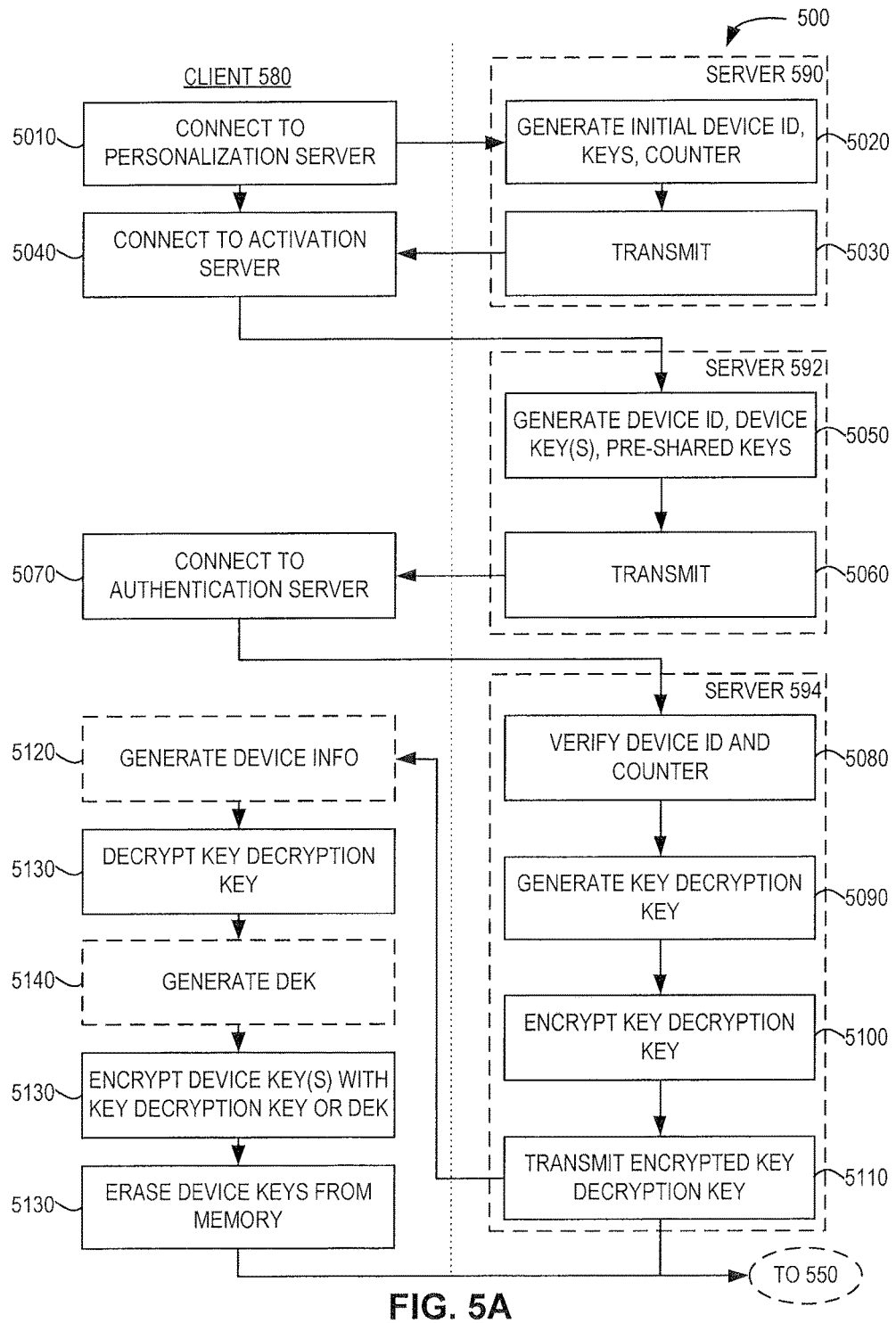
FIG. 5A is a flow diagram for an example device provisioning process.

Referring now to FIG. 5A, there is illustrated a flow diagram for an example device provisioning process, which may be executed by elements of system 100 of FIG. 1, for example.

Flow 500 may be executed between a client 580, a personalization server 590, an activation server 592 and an authentication server 594. Client 580 may be implemented by computing device 120 of FIG. 1. Similarly, personalization server 590 may be implemented by personalization server 160 of FIG. 1, activation server 592 may be implemented by registration server 130 of FIG. 1 and authentication server 594 may be implemented by authentication server 140 of FIG. 1. It will be appreciated that, in some embodiments, the functions of one or more of servers 590, 592 and 594 may be merged, or further divided among different servers.

Flow 500 may be used to provision a client device for performing authentication at a later time.

Flow 500 beings at 5010 with client 580 connecting to personalization server 590 to initiate the provisioning process and sending a provisioning request.

At 5020, personalization server 590 receives the provisioning request and generates an initial personalization identifier and initial cryptographic keys to be used by client 580 during the provisioning process. Optionally, personalization server 590 may also initialize a transaction counter with a random value. Use of a transaction counter provides additional security against replay attacks and therefore its use is described herein. However, in some embodiments, the transaction counter may be omitted.

At 5030, personalization server 590 transmits the personalization identifier, the initial cryptographic keys and the transaction counter to the client 580.

At 5040, client 580 temporarily stores the personalization identifier, initial cryptographic keys and transaction counter, connects to activation server 592 and sends an activation request. The activation request includes the personalization identifier provided by server 590.

At 5050, activation server 592 receives the activation request and personalization identifier, and generates a device identifier along with device cryptographic keys ("device keys" or, sometimes, "applet keys"). In some embodiments, activation server 592 also generates at least one pre-shared key to be shared by client 580 and authentication server 594. The device identifier is a unique identifier assigned to the client 580. The device cryptographic keys may be the public and private keys associated with an asymmetric public key cryptographic key pair (e.g., RSA). In some embodiments, the device cryptographic keys may be keys for a symmetric cryptographic algorithm (e.g., Advanced Encryption Standard or AES). The pre-shared keys are generally symmetric keys and may be referred to, for example, as PSK1, PSK2, etc.

At 5060, server 592 and client 580 establish a communication link using the Global Platform SCP-03 protocol, for example, and server 592 transmits the device identifier, device keys and pre-shared keys to client 580, via the SCP-03 connection.

At 5070, client 580 stores the device identifier and pre-shared keys in persistent (e.g., non-volatile memory), but stores the device keys only in volatile memory. In general, device keys are only stored in volatile memory, which is erased when the device keys are no longer in use. Optionally, client 580 increments the transaction counter. Client 580 then connects to authentication server 594 to send a device authentication request and transmits its device identifier and transaction counter value with the request.

Authentication server 594 receives the device authentication request and verifies that the device identifier is valid, and that the transaction counter value is within an acceptable range. For example, the transaction counter value may be deemed valid if it is within a predetermined delta of the last transaction counter value known to server 594.

If the device identifier and transaction counter value are valid, authentication server 594 updates its own transaction counter value, and at 5090 generates a key decryption key for the client 580 based on a master key. The master key may be stored in a hardware security module of the authentication server 594. In addition, the key decryption key may be generated based on data provided by or associated with the client 580 such as, for example, the device identifier.

At 5100, authentication server 594 encrypts the generated key decryption key using one of the pre-shared keys generated at 5050. For example, PSK2 may be used to encrypt the key decryption key. The encrypted version of the key decryption key may be referred to as the locking component in the context of flow 500.

At 5110, authentication server 594 transmits the locking component to client 580.

Optionally, at 5120, client 580 may generate or determine certain device information to be used in the generation of a diversified encryption key (DEK), the use of which is described further below. The device information may include, for example, unique identifiers such as MAC address, serial number, etc.

At 5130, client 580 decrypts the locking component using the appropriate pre-shared key (e.g., PSK2).

Optionally, if a diversified encryption key is being used, client 580 may generate the DEK at 5140 using the device information determined at 5120 and the key decryption key. For example, the DEK may be generated by using the device information and key decryption key as inputs to a cryptographic function, by XOR-ing the device information with the key decryption key, or according to other predetermined schemes.

In either case, client 580 proceeds to encrypt its device keys at 5150 using either the key decryption key (or DEK, if it is being used), and storing the encrypted device keys in persistent memory.

At 5160, client 580 erases the portion of volatile memory that holds the unencrypted device keys, the key decryption key and the DEK (if it exists) to prevent unauthorized retrieval. In this state, client 580 is considered to be "locked", since it can no longer retrieve or use the device keys unless the key decryption key is again obtained from authentication server 594.

Figure 5B:
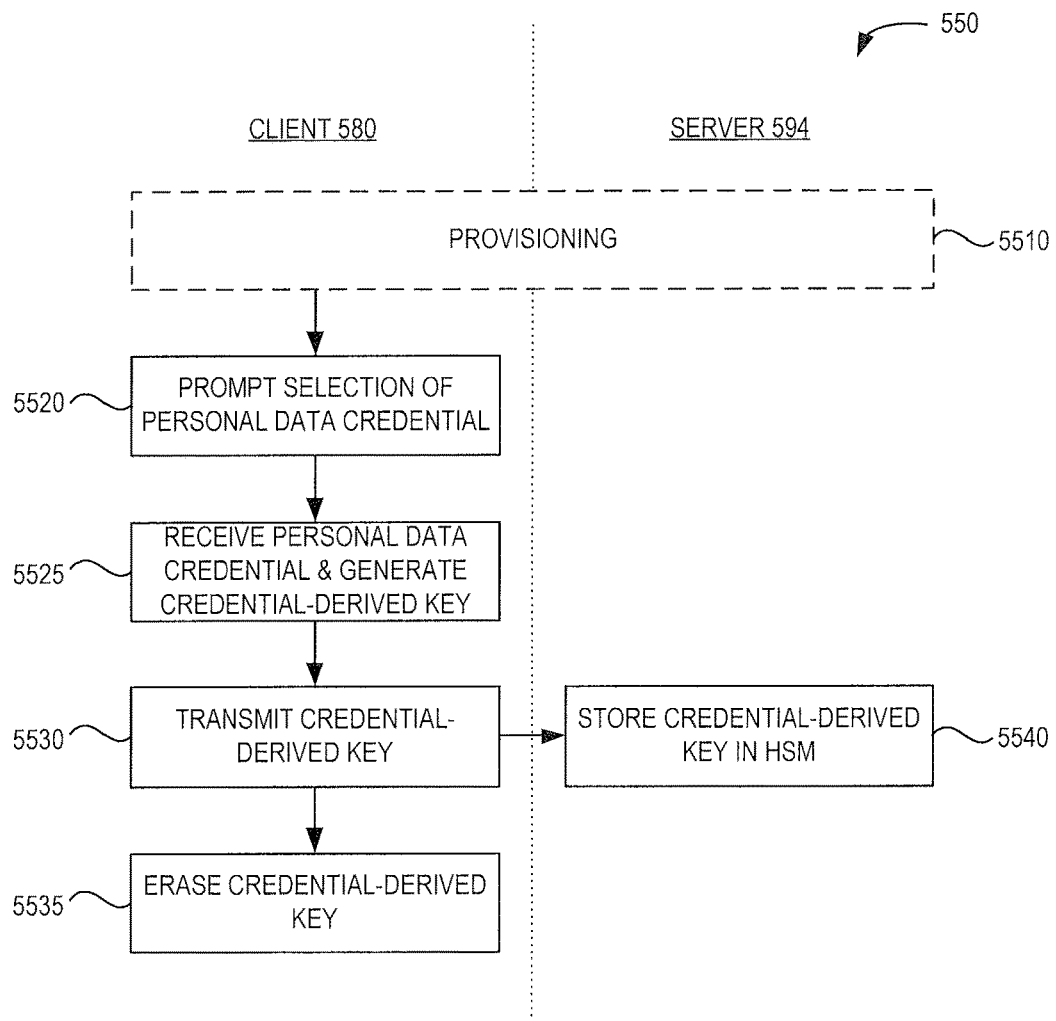
FIG. 5B is a flow diagram for an example personal data credential provisioning process.

Referring now to FIG. 5B, there is illustrated a flow diagram for an example personal data credential provisioning process, which may be executed by elements of system 100 of FIG. 1, for example.

Flow 550 may be executed between a client 580, which may be implemented by computing device 120 of FIG. 1, and a server 590, which may be implemented by registration server 130 of FIG. 1. In some cases, the functionality of a registration server 130 may be combined with an authentication server 140.

Flow 550 may be used to provision a client device for an enhanced authentication approach that employs a personal data credential.

At 5510 a device provisioning process takes place. For example, the device provisioning process may be the process shown with respect to flow 500 of FIG. 5A. However, in other embodiments, client 580 and an authentication server 594 may have previously undergone provisioning using another process.

At 5520, client device 580 generates a prompt to a user of the client device 580 to provide input for a new personal data credential.

In some cases, the personal data credential may be an alphanumeric passcode, in which case the prompt may be a prompt on a display of the client device and the user may enter the desired passcode via a keypad or touchscreen.

In other cases, the personal data credential may computed from biometric data, such as a fingerprint, in which case the prompt may be displayed or otherwise communicated to the user, and a biometric input device may be used to capture the biometric data.

The biometric data may be processed to identify features in the biometric data that can be reliably and repeatedly captured, thus creating a biometric data item. For example, in the case of a fingerprint, known fingerprint features may be mapped and used to generate a mapped representation that forms the personal data credential.

At 5525, client device 580 receives the personal data credential via the appropriate input device and processes the personal data credential to generate a credential-derived key. The credential-derived key may be created, for example, by performing one or more computations on the input data to create a fixed length key.

In one example, the Password-based Encryption Standard (PKCS5) may be used to process the personal data credential to generate the credential-derived key. For example, a 256-bit salt may be generated using a local random or pseudo-random number generator. A binary long object (BLOB) may also be used, along with a user identifier. A Password-Based Key Derivation Function (e.g., PBKDF2, used with SHA256) may be applied to the personal data credential, salt, BLOB and user identifier, and iterated a predetermined number of times to generate the credential-derived key.

For example, the credential-derived key may be computed by concatenating the personal data credential with the salt, and further taking the result of the concatenation and exclusive-ORing with the BLOB:

$$PKCS5((PDC\|salt)\oplus BLOB)$$

where PDC is the personal data credential.

The iteration count for the key derivation function may be set such that the time to perform the overall operation is not less than one-tenth of a second. In some cases, particularly in the case of software-based secure elements, a minimum iteration count may be set (e.g., 10,000 iterations).

At 5530, the credential-derived key is transmitted securely to server 594. For example, the credential-derived key may be transmitted via SCP03, or some other suitable secure channel. Client 580 and server 594 may also each update respective user authentication counter values.

At 5540, server 594 receives the credential-derived key, associates it with client 580, and stores the credential-derived key securely, for example in a HSM of the server 594.

At 5535, the credential-derived key is wiped or discarded from volatile memory. Discarding the credential-derived key ensures that it can only be recovered by the client device 580 if the personal data credential is supplied again by the user, and the same key derivation function is applied.

Figure 6A:
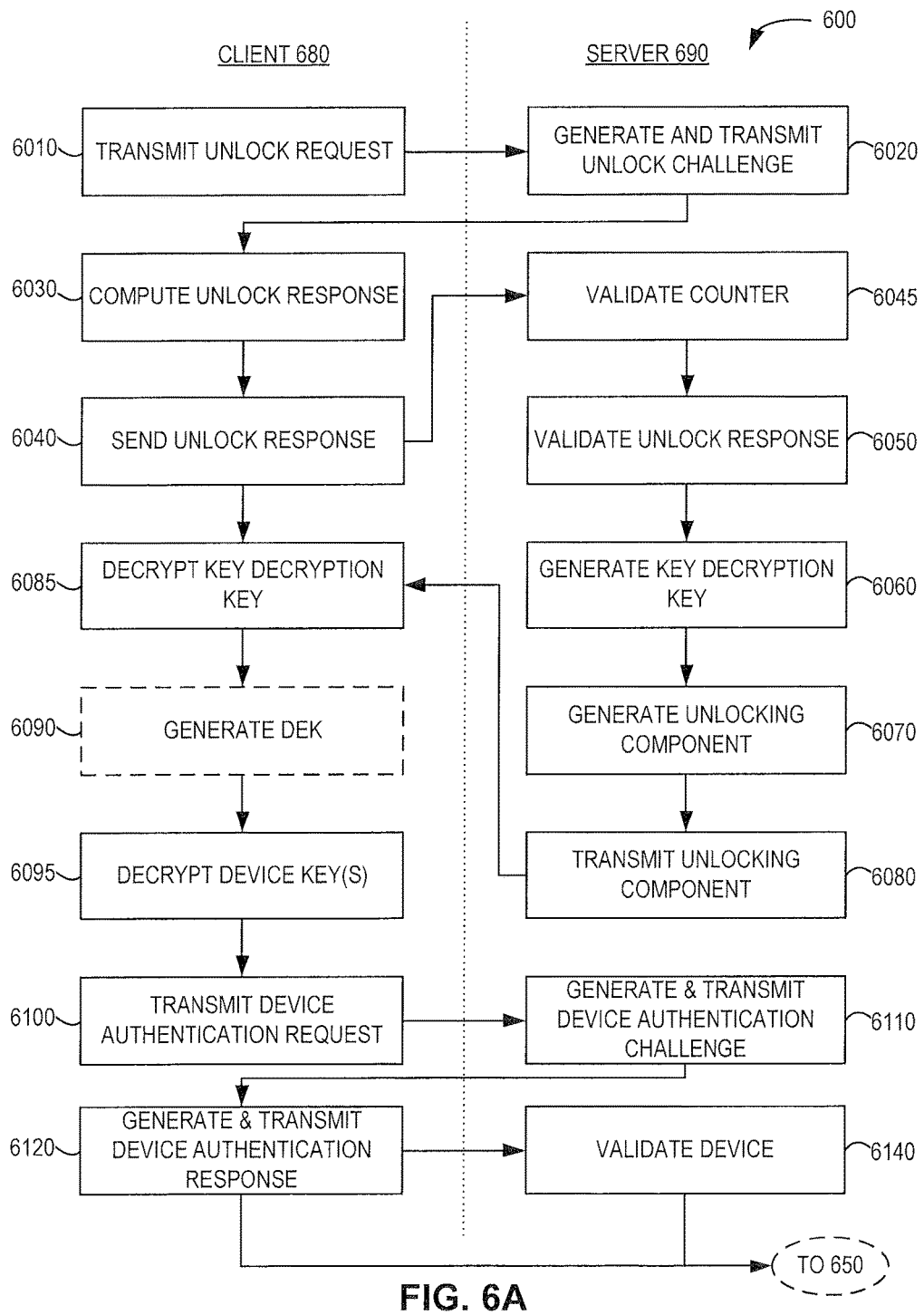
FIG. 6A is a flow diagram for an example device authentication process.

Referring now to FIG. 6A, there is illustrated a flow diagram for an example device authentication process, which may be executed by system 100 of FIG. 1, for example.

Flow 600 may be executed between a client 680, which may be implemented by computing device 120 of FIG. 1, and an authentication server 690, which may be implemented by authentication server 140 of FIG. 1. Authentication server 690 may be divided among multiple physical or logical servers. In particular, authentication server 690 may have more than one endpoint (e.g., interface) with its own address or domain name. The use of multiple endpoints allows for additional security, since specific endpoints can be rotated or changed on a regular basis to prevent replay attacks. Flow 600 may include elements of conventional challenge-response protocols, such as OCRA, for example.

As discussed herein, OCRA forms a part of the OATH protocol and, in general is used to compute a cryptogram based on the following formula:

OCRA Cryptogram=CryptoFunction(*K*,DataInput)

where the default CryptoFunction is a HOTP, which uses secret key K and takes DataInput as input. In general, secret key K is a pre-shared key, and DataInput includes challenge data. In some cases, DataInput may also include other data, such as a counter value or timestamp, concatenated or otherwise combined with the challenge data.

Flow 600 begins at 6010 with client 680 transmitting an unlock request to authentication server 690. The unlock request may include, for example, a device identifier and, optionally, an unlock transaction counter value.

At 6020, authentication server 690 generates an unlock challenge and transmits the unlock challenge to client 680. The challenge message may include one or more "challenge questions" (i.e., data values) generated by the authentication server 690, and may even include at least one challenge question supplied by the client 680 (not shown in flow 600).

The challenge questions may be concatenated together, or otherwise combined in known fashion, to obtain the challenge message. In some cases, the challenge message may have a predetermined fixed length (e.g., 128 bytes), in which case it may be zero padded or truncated as needed to obtain the desired length.

The challenge questions may include a random or pseudorandom number generated by the client or server, or both. In some cases, the challenge questions may also include a timestamp or counter value, or both, although in other cases the timestamp or counter value may be concatenated or combined with the challenge message in a separate operation. The challenge message preferably is unique to each transaction.

At 6030, the client 680 receives the unlock challenge and computes an unlock response based on the unlock challenge. The unlock response may be an OCRA cryptogram computed from the unlock challenge using a first pre-shared key PSK1. Optionally, input to the cryptogram may include the unlock transaction counter value either concatenated or otherwise combined with the unlock challenge data.

At 6040, client 680 transmits the unlock response to server 690.

Acts 6010 to 6040 of flow 600 may be performed using a first endpoint of authentication server 690, which can be referred to as the unlocking endpoint. Subsequent acts of flow 600 and flow 650 may be performed using a second endpoint of authentication server 690, which can be referred to as the authentication endpoint.

If the unlock transaction counter is in use, the value received from client 680 may be validated at 6045.

At 6050, the unlock response is validated by the server 690 independently computing the same OCRA cryptogram, using the same inputs (e.g., unlock challenge, unlock transaction counter value, etc.).

If the unlock transaction counter and unlock response are successfully validated, server 690 generates a key decryption key for client 680 at 6060, where the key decryption key is generated based on a master key. For example, the key decryption key may be generated by applying a cryptographic hash function to the master key and other data associated with the client 680 (e.g., device identifier). The master key may itself be securely stored in the HSM of server 690. In some embodiments, server 690 may not generate the key decryption key with each unlocking, but may instead securely store the key decryption key and retrieve it when needed.

At 6070, server 690 generates an unlocking component for client 680 by encrypting the generated key decryption key using another pre-shared key, such as PSK2.

The unlocking component is transmitted to client 680 at 6080.

At 6088, client 680 obtains the key decryption key by decrypting the unlocking component using the pre-shared key used to encrypt at the server 690 (e.g., PSK2).

Optionally, client 680 may process the key decryption key to generate a diversified encryption key (DEK) at 6090. Generation of the DEK may involve concatenation or other combination with other known data, such as a device identifier.

At 6095, client 680 retrieves an encrypted device key from persistent memory of the client 680, and decrypts it using the key decryption key (or the DEK, if it is used) to obtain the device key in decrypted form. In some cases, more than one device key may be obtained in similar fashion (e.g., multiple device keys may be stored in encrypted fashion).

To verify that the correct device key has been successfully retrieved, at 6100 client 680 transmits a device authentication request to the server 690. The device authentication request may include, for example, the device identifier.

At 6110, server 690 generates and transmits a device authentication challenge to client 680 in response to the request.

Client 680 generates a device authentication response at 6120 and transmits it to server 690, in similar fashion to earlier challenge responses. For example, client 680 may compute an OCRA cryptogram from the device authentication challenge using the decrypted device key.

Server 690 validates the device authentication response (e.g., by independently computing the expected cryptogram and comparing) at 6140.

In some embodiments, device authentication may be completed upon successful validation at 6140. However, in other embodiments, further authentication may be desired, particularly if individual users are to be authenticated, as opposed to device authentication.

Both client 680 and server 690 may be preconfigured to require user authentication. If user authentication is required, client 680 and server 690 may proceed to user authentication flow 650.

Figure 6B:
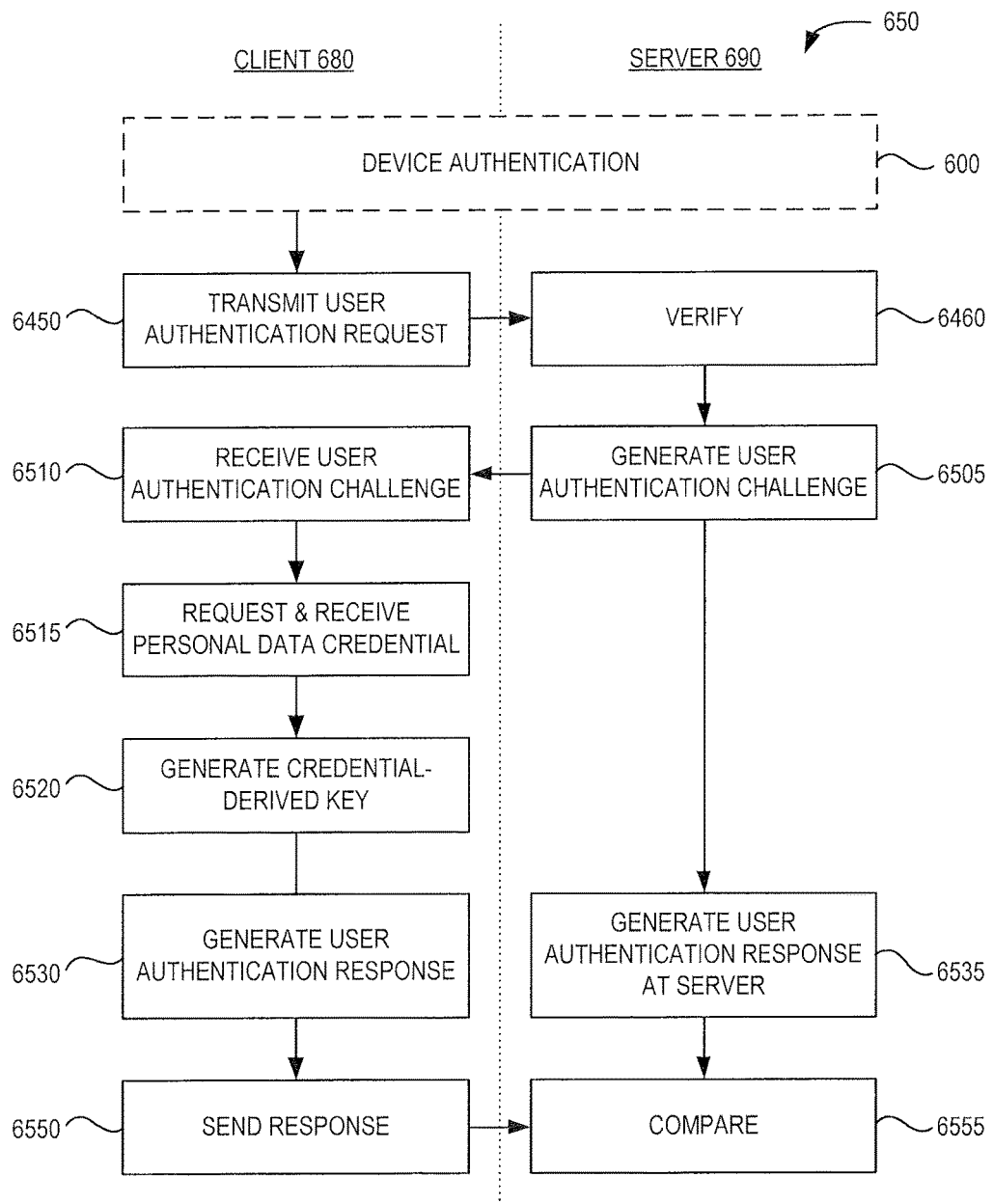
FIG. 6B is a flow diagram for an example user authentication process.

Referring now to FIG. 6B, there is illustrated a flow diagram for an example user authentication flow, which may be executed by system 100 of FIG. 1, for example.

Flow 650 may be executed between a client 680, which may be implemented by computing device 120 of FIG. 1, and a server 690, which may be implemented by authentication server 140 of FIG. 1. Flow 650 may include elements of conventional challenge-response protocols, such as OCRA, for example.

Flow 650 generally begins following successful completion of flow 600. However, in some embodiments, flow 650 may be carried out independently of flow 600, in which case it is assumed that the client and server have already been provisioned using a process as described with respect to flow 500 or flow 550, or both, for example, such that pre-shared secret keys are available to both the client and server.

At 6450, client 680 generates and transmits a user authentication request to server 690. The user authentication request may include a user identifier, device identifier and, optionally, a user authentication version value. Each personal data credential selected by a user may be assigned a unique user authentication version value, allowing the server 690 to identify which personal data credential is being used. The user authentication version value may also serve as a transaction counter.

At 6460, server 690 verifies the user authentication version value, if present, and identifies the user to be authenticated based on the user identifier.

Server 690 generates and transmits a user authentication challenge to client 680 at 6505. As with other challenges described herein, the challenge message may include one or more "challenge questions" (i.e., data values) generated by the server 690, and may include at least one challenge question supplied by the client 680 in the user authentication request (not shown in flow 650).

Client 680 receives the challenge message at 6510, and generates a prompt in a user interface of the client 680 at 6515 to supply a previously-provided personal data credential, as received during the provisioning process flow 550. The personal data credential is then supplied using an appropriate input interface of client 680 (e.g., keyboard, fingerprint reader, etc.).

At 6520, client 680 processes the personal data credential in similar fashion to 5525 of process flow 550, for example using PKCS5 to generate the credential-derived key from the personal data credential, salt and BLOB, for example.

At 6530, client 680 computes a user authentication response based on the user authentication challenge. As with other challenges described herein, the response may be an OCRA cryptogram, in this case computed on the user authentication challenge using the credential-derived key.

At 6535, server 690 independently computes the same cryptogram, using its copy of the credential-derived key.

At 6550, client 680 transmits the user authentication response to server 690, which compares the client-computed cryptogram with the server-computed cryptogram at 6555 to determine whether user authentication is successful.

The described embodiments generally provide for a software-based secure element system that replicates the functionality of hardware secure elements. The software-based secure element can be implemented by various computing devices, such as mobile phones. The described embodiments include safeguards against the loss, cloning or copying of an entire device, since sensitive information can only be retrieved with the assistance of a server.

In general, the described embodiments are implemented by a set of design principles, which inform the operation of the computing devices and servers. In particular, sensitive cryptographic keys should be stored only in encrypted form at the user's computing device (with some exceptions for certain pre-shared keys, such as PSK1 or PSK2). The encryption for sensitive cryptographic keys should require a component that is retrievable only from an external source via a secure connection, and is not stored locally at the computing device. The external source should validate the computing device each time the component is requested. Preferably, the keys required to decrypt sensitive cryptographic keys require additional information, such as a device identifier, to reconstitute the correct key. Sensitive cryptographic keys should not be stored in persistent memory, should only be kept in volatile memory while in use, which volatile memory should be erased when the key is no longer in use.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of authenticating a computing device for a transaction using a server, the method comprising:
    transmitting an unlock request to the server to gain access to a key decryption key;
    receiving an unlock challenge from the server in response to the unlock request;
    generating an unlock response based on the unlock challenge;
    transmitting the unlock response to the server for validation by the server;
    obtaining the key decryption key from the server in response to validation of the unlock response by the server;
    using the key decryption key, decrypting an encrypted device key stored in a persistent memory of the computing device to obtain a device key in decrypted form;
    transmitting a device authentication request to the server;
    receiving a device authentication challenge from the server; and
    generating a device authentication response based on the device authentication challenge and the device key;
    transmitting a user authentication request to the server;
    receiving a user authentication challenge from the server;
    prompting for a personal data credential via a user interface of the computing device;
    receiving the personal data credential at the computing device;
    processing the personal data credential to generate a credential-derived key;
    generating a user authentication response based on the user authentication challenge and using the credential-derived key;

transmitting the user authentication response to the server; and in response to the server determining that the user authentication response is valid, the computing device performing the transaction.

2. The method of claim 1, wherein the user authentication request comprises a device identifier and a user identifier.

3. The method of claim 2, wherein the user authentication request further comprises a user authentication counter value.

4. The method of claim 1, wherein the credential-derived key is stored only in a volatile memory of the computing device, and further comprising discarding the credential-derived key from a memory of the computing device after generating the user authentication response.

5. The method of claim 1, wherein the key decryption key is stored only in a volatile memory of the computing device, and further comprising discarding the key decryption key from a memory of the computing device after generating the device authentication response.

6. The method of claim 1, wherein the unlock request is transmitted to a first endpoint of the server.

7. The method of claim 1, wherein the unlock request comprises a device identifier.

8. The method of claim 1, wherein the unlock request comprises an unlock counter value.

9. The method of claim 1, wherein the unlock response is generated using a first pre-shared key, wherein the first pre-shared key is known to the server and the computing device.

10. The method of claim 1, wherein the unlock response comprises an unlock cryptogram.

11. The method of claim 1, wherein the unlock cryptogram is computed using an open authentication challenge-response algorithm (OCRA).

12. The method of claim 1, wherein the unlock response is transmitted to the first endpoint of the server.

13. The method of claim 1, wherein obtaining the key decryption key comprises receiving an unlocking component, and using the unlocking component to generate the key decryption key at the computing device.

14. The method of claim 13, wherein the unlocking component is an encrypted version of the key decryption key, and wherein the encrypted version is encrypted using a second pre-shared key.

15. The method of claim 14, wherein the key decryption key is based on a master key stored in a hardware security module of the server.

16. The method of claim 1, wherein the device authentication request is transmitted to a second endpoint of the server.

17. The method of claim 1, wherein the device authentication response comprises a device authentication cryptogram.

18. The method of claim 1, wherein the device authentication cryptogram is computed using an open authentication challenge-response algorithm (OCRA).

19. A method of authenticating a computing device for a transaction at a server, the method comprising:
receiving an unlock request to gain access to a key decryption key from the computing device;
generating and transmitting an unlock challenge to the computing device in response to the unlock request;
receiving an unlock response based on the unlock challenge;
validating the unlock response;
when the unlock response is validated correctly, forwarding the key decryption key to the computing device;
receiving a device authentication request from the computing device;
generating and transmitting a device authentication challenge to the computing device;
receiving a device authentication response based on the device authentication challenge;
validating the device authentication response, wherein validating the device authentication response comprises determining that user authentication is required;
receiving a user authentication request from the computing device;
generating and transmitting a user authentication challenge to the computing device;
receiving a user authentication response from the computing device;
validating the user authentication response; and
when the user authentication response is valid, authenticating the computing device to perform the transaction.

20. The method of claim 19, wherein validating the user authentication response comprises computing a server-computed cryptogram and comparing the server-computed cryptogram to the user authentication response.

21. A system for facilitating authentication for a transaction using a virtual secure element, the system comprising:
a computing device; and
a server, the server comprising:
a server memory that stores first computer-executable instructions;
a server processor, the server processor configured to execute the first computer-executable instructions to:
receive an unlock request to gain access to a key decryption key from the computing device;
generate and transmit an unlock challenge to the computing device in response to the unlock request;
receive an unlock response based on the unlock challenge;
validate the unlock response;
when the unlock response is validated correctly, forward the key decryption key to the computing device;
receive a device authentication request from the computing device;
generate and transmit a device authentication challenge to the computing device;
receive a device authentication response based on the device authentication challenge;
validate the device authentication response, wherein validating the device authentication response comprises determining that user authentication is required;
receive a user authentication request from the computing device;
generate and transmitting a user authentication challenge to the computing device;
receive a user authentication response from the computing device;
validate the user authentication response; and
when the user authentication response is valid, authenticate the computing device to perform the transaction;
the computing device comprising:
a device memory that stores second computer-executable instructions; and a device processor, the device processor configured to execute the second computer-executable instructions to:
  transmit the unlock request to the server to gain access to the key decryption key;
  receive the unlock challenge from the server in response to the unlock request;
  generate the unlock response based on the unlock challenge;
  transmit the unlock response to the server;
  obtain the key decryption key from the server;
  using the key decryption key, decrypt an encrypted device key stored in a persistent memory of the computing device to obtain a device key in decrypted form;
  transmit the device authentication request to the server;
  receive the device authentication challenge from the server;
  generate the device authentication response based on the device authentication challenge and the device key;
  transmit a user authentication request to the server;
  receive a user authentication challenge from the server;
  prompt for a personal data credential via a user interface of the computing device;
  receive the personal data credential at the computing device;
  process the personal data credential to generate a credential-derived key;
  generate a user authentication response based on the user authentication challenge and using the credential-derived key;
  transmit the user authentication response to the server; and
  in response to the server determining that the user authentication response is valid, perform the transaction.

22. The system of claim 21, wherein validating the user authentication response comprises computing a server-computed cryptogram and comparing the server-computed cryptogram to the user authentication response.

* * * * *